(12) United States Patent
Ono et al.

(10) Patent No.: US 7,076,668 B1
(45) Date of Patent: Jul. 11, 2006

(54) DATA USAGE CONTROLLING APPARATUS THAT PREVENTS THE UNAUTHORIZED USE OF MAIN DATA BY UPDATING A TYPE 1 AND A TYPE 2 KEY USED FOR PROTECTING THE MAIN DATA IN ACCORDANCE WITH USAGE OF THE MAIN DATA

(75) Inventors: Takatoshi Ono, Aichi-ken (JP); Shunji Harada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/558,022

(22) Filed: Apr. 25, 2000

(30) Foreign Application Priority Data

Apr. 27, 1999 (JP) ............................. 11-119442
Mar. 31, 2000 (JP) ............................. 2000-99573

(51) Int. Cl.
*G06F 12/14* (2006.01)
(52) U.S. Cl. ..................................................... 713/193
(58) Field of Classification Search ................ 713/193, 713/162; 380/201, 273, 200, 211, 282; 705/57, 705/1
See application file for complete search history.

(56) References Cited

U.S. PATENT DOCUMENTS

| | | | | |
|---|---|---|---|---|
| 4,780,905 A | | 10/1988 | Cruts et al. | |
| 5,142,578 A | | 8/1992 | Matyas et al. | |
| 5,557,678 A | * | 9/1996 | Ganesan | 380/282 |
| 5,659,615 A | * | 8/1997 | Dillon | 713/162 |
| 5,870,474 A | * | 2/1999 | Wasilewski et al. | 380/211 |
| 6,014,745 A | * | 1/2000 | Ashe | 713/193 |
| 6,026,165 A | * | 2/2000 | Marino et al. | 380/273 |
| 6,085,323 A | * | 7/2000 | Shimizu et al. | 713/201 |
| 6,424,714 B1 | * | 7/2002 | Wasilewski et al. | 380/200 |
| 6,587,948 B1 | * | 7/2003 | Inazawa et al. | 713/193 |
| 6,615,192 B1 | * | 9/2003 | Tagawa et al. | 705/57 |
| 2001/0008016 A1 | * | 7/2001 | Kotani et al. | 713/193 |
| 2002/0002466 A1 | * | 1/2002 | Kambayashi et al. | 705/1 |
| 2003/0190043 A1 | * | 10/2003 | Sigbjornsen et al. | 380/201 |

FOREIGN PATENT DOCUMENTS

JP 9185501 7/1997

* cited by examiner

*Primary Examiner*—Christopher Revak
*Assistant Examiner*—Arezoo Sherkat

(57) ABSTRACT

A data usage controlling apparatus that reads a type 1 key from a storage unit and (a) main data, (b) a type 2 key that has been encrypted using the type 1 key, and (c) condition information that has been encrypted using the type 2 key from a recording medium, decrypts the condition information using the type 2 key, and controls usage of the read main data in accordance with the decrypted condition information. In accordance with usage of the main data, the decrypted condition information is updated, a new type 2 key is generated, and the stored type 1 key is updated. The updated condition information is encrypted using the new type 2 key and used to replace the encrypted condition information on the recording medium. The new type 2 key is encrypted using the updated type 1 key and used to replace the encrypted type 2 key on the recording medium.

11 Claims, 14 Drawing Sheets

DATA USAGE CONTROLLING APPARATUS THAT PREVENTS THE UNAUTHORIZED USE OF MAIN DATA BY UPDATING A TYPE 1 AND A TYPE 2 KEY USED FOR PROTECTING THE MAIN DATA IN ACCORDANCE WITH USAGE OF THE MAIN DATA

BACKGROUND OF THE INVENTION (1) Field of the Invention

The present invention relates to a data usage controlling apparatus that limits the usage of main data according to judgements made on condition information recorded on a same recording medium as the main data. In particular, the invention relates to a data usage controlling apparatus that encrypts condition information using a type 2 key and records the encrypted condition information onto a recording medium along with the type 2 key that is encrypted using a type 1 key.

(2) Related Art

Images and music are increasingly being stored in a digital form. Digitization of such information allows high quality to be preserved regardless of how often the content is used. Since images and music are usually subject to copyrights, the ease with which digitized images and music can be transmitted, copied and distributed makes it relatively simple for users to use digitized images and audio in an illegal manner.

Legal steps are being taken to stop the illegal use of copyrighted material, though more importantly several data usage controlling systems have been proposed. Such systems allow valid usage of digital content, such as copyrighted material, but prevent illegal operations from being made.

Japanese Laid-Open Patent Application No. H09-185501 discloses a software executing system as one type of data usage controlling system. This system stops users from illegally using (i.e., executing) software, which is regarded as one form of digital content. This software executing system is described below.

FIG. 1 is a first block diagram showing the composition of a recording medium 300 and an executing apparatus 400 included in this conventional software executing system, while FIG. 2 is a second block diagram showing the compositions of the recording medium 300 and the executing apparatus 400. In these drawings, the executing apparatus 400 included in this software executing system is shown split into the part in FIG. 1 that handles the execution of software and the part shown in FIG. 2 that handles the updating (by encrypting with a random number) of the supplementary key of the recording medium. This depiction of the executing apparatus 400 in two parts is merely to assist understanding, and it should be remembered that both parts are provided within the same apparatus.

As shown in FIG. 1, this conventional software executing system includes a recording medium 300 that stores various programs to be executed and an executing apparatus 400 that selectively executes one of the programs recorded on the recording medium 300.

In more detail, the recording medium 300 stores the following information relating to the software program $S_A$:

(1) an encrypted copy $E(K_A, S_A)$ of the software program $S_A$ produced by encrypting the software program $S_A$ itself using the software key $K_A$ (the copy hereafter being referred to as the "encrypted software $E(K_A, S_A)$");

(2) an encrypted software key/execution number $E(R_A, (K_A, n_A))$ that is produced by encrypting a combination of the software key $K_A$ and the remaining number of possible executions $n_A$ for the software program $S_A$ using an exclusive supplementary key $R_A$ for the software program $S_A$; and (3) an encrypted supplementary key $E(R, R_A)$ produced by encrypting the supplementary key $R_A$ using a random number R.

In the same way, the recording medium 300 stores the following information relating to the software program $S_B$:

(1) an encrypted copy $E(K_B, S_B)$;

(2) an encrypted software key/execution number $E(R_B, (K_B, n_B))$; and (3) an encrypted supplementary key $E(R, R_B)$.

The notation $E(y,x)$ used in this specification indicates that the information x has been encrypted using the information y as the encryption key. While the present example shows the case where the recording medium 300 only records the two software programs $S_A$ and $S_B$, it is customary for three or more programs to be recorded with the information described above relating to their execution.

As shown in FIG. 1, the part of the executing apparatus 400 that handles the execution of software includes the following functional components 401–408. A random number storing unit 401 stores a random number in a manner that prevents its stored content being read or changed from outside the apparatus. A first decrypting unit 402 decrypts an encrypted supplementary key (e.g., $E(R, R_A)$) stored on the recording medium 300 using the random number R stored in the random number storing unit 401. A second decrypting unit 403 decrypts an encrypted software key/execution number (e.g., $E(R_A, (K_A, n_A))$) stored on the recording medium 300 using the supplementary key decrypted by the first decrypting unit 402. A third decrypting unit 404 decrypts the encrypted software (e.g., $E(K_A, S_A)$) using the software key decrypted by the second decrypting unit 403. A software executing unit 405 executes the software program decrypted by the third decrypting unit 404. An execution number examining unit 406 examines the (remaining) execution number decrypted by the second decrypting unit 403 when a software program is to be executed and informs the software executing unit 405 whether or not execution is permitted for the software program. An execution number updating unit 407 updates the execution number in accordance with executions of the software program. A first encrypting unit 408 encrypts the software key decrypted by the second decrypting unit 403 and the execution number updated by the execution number updating unit 407 using the supplementary key decrypted by the first decrypting unit 402 and updates the encrypted software key/execution number on the recording medium 300.

As shown in FIG. 2, the part of the executing apparatus 400 that handles the updating of the encrypted supplementary key includes a fourth decrypting unit 411, a random number updating unit 412, and a second encrypting unit 413. The fourth decrypting unit 411 decrypts the encrypted supplementary key of every software program on the recording medium 300 using the random number stored in the random number storing unit 401. The random number updating unit 412 updates the random number stored in the random number storing unit 401. The second encrypting unit 413 encrypts every supplementary key that has been decrypted by the fourth decrypting unit 411 using the random number that has been updated by the random number updating unit 412, and updates the encrypted supplementary key of each software program on the recording medium 300.

The executing apparatus 400 shown in FIGS. 1 and 2 uses the procedure described below to execute software programs stored on the recording medium 300 and update the execution numbers of the executed programs. This procedure is called the "software execution procedure". In addition, the executing apparatus 400 updates the encrypted supplementary keys on the recording medium 300 in accordance with the execution of programs. This is achieved by updating the random number used for the encrypting and then replacing the encrypted supplementary keys using this updated random number. This procedure is called the "encrypted supplementary key updating procedure".

FIG. 3 is a flowchart showing the software execution procedure performed by the executing apparatus 400, while FIG. 4 is a flowchart showing the encrypted supplementary key updating procedure performed by the executing apparatus 400. The illustrated example focuses on the case where the software program $S_A$ is executed, though the same procedures will be used when the software program $S_B$ is executed.

As shown in FIG. 3, the software execution procedure starts with the executing apparatus 400 obtaining the information relating to the software program $S_A$ (which has been indicated by a user) from the recording medium 300 (S301). This information is the encrypted supplementary key E(R, $R_A$), the encrypted software key/execution number E($R_A$, ($K_A$,$n_A$)), and the encrypted software E($K_A$,$S_A$). The first decrypting unit 402 then decrypts the encrypted supplementary key E(R,$R_A$) using the random number R stored in the random number storing unit 401 to obtain the supplementary key $R_A$ (S302). The second decrypting unit 403 decrypts the encrypted software key/execution number E($R_A$, ($K_A$,$n_A$)) using this supplementary key $R_A$ to obtain the software key $K_A$ and the execution number $n_A$ (S303). The third decrypting unit 404 then decrypts the encrypted software E($K_A$,$S_A$) to obtain the software program $S_A$ (S304).

After this, the execution number examining unit 406 examines whether the execution number $n_A$ obtained in S303 is at least one (S305). If not (S305:No), the procedure ends with the execution number examining unit 406 informing the software executing unit 405 that execution of the software program $S_A$ is not permitted. If the execution number $n_A$ obtained in S303 is one or greater (S305:Yes), the execution number examining unit 406 informs the software executing unit 405 that execution of the software program $S_A$ is permitted, so that the software executing unit 405 executes the software program $S_A$ (S306).

Once the software program $S_A$ has been executed, the execution number updating unit 407 updates the execution number $n_A$ to $n_A'$ found by subtracting one from the current value (i.e., $n_A'=(n_A-1)$) (S307). The first encrypting unit 408 encrypts a combination of this updated execution number $n_A'$ and the software key $K_A$ that was obtained in S302 using the supplementary key $R_A$ (S308). The encrypted software key/execution number E($R_A$, ($K_A$,$n_A'$)) produced by the first encrypting unit 408 is then written onto the recording medium 300 in place of the encrypted software key/execution number E($R_A$, ($K_A$,$n_A$)) (S309). This completes the software execution procedure.

As shown in FIG. 4, the encrypted supplementary key updating procedure starts with all of the encrypted supplementary keys on the recording medium 300 (in this case, the encrypted supplementary keys E(R,$R_A$) and E(R,$R_B$)) being obtained (S401). The fourth decrypting unit 411 decrypts these encrypted supplementary keys E(R,$R_A$) and E(R,$R_B$) using the random number R stored in the random number storing unit 401 to obtain the supplementary keys $R_A$ and $R_B$ (S402).

Next, the random number updating unit 412 updates the random number R in the random number storing unit 401 using the random number R' (S403). The second encrypting unit 413 then encrypts the supplementary keys $R_A$ and $R_B$ obtained in S402 using the new random number R' (S404). These encrypted supplementary keys E(R', $R_A$) and E(R',$R_B$) are then stored on the recording medium 300 in place of the encrypted supplementary keys E(R,$R_A$) and E(R,$R_B$) (S405). This completes the encrypted supplementary key updating procedure.

In this conventional software executing system, the software key and the execution number are stored on the recording medium in an encrypted form. This prevents users from editing the content of this data and so prevents the software programs from being used illegally.

In particular, the above procedure has an updated random number stored in the executing apparatus 400 and on the recording medium 300 whenever a software program is executed. As one example, even if all the information on the recording medium 300 is copied, the copied recording medium 300 cannot be executed on any executing apparatus aside from the executing apparatus 400. Also, if a user somehow stopped the executing apparatus 400 writing (i.e. updating) information on the recording medium 300, the executing apparatus 400 would thereafter not be able to use the recording medium 300. This means that this conventional software executing system is capable of preventing users from making certain illegal uses of software.

The above software executing system is however incapable of preventing users from illegally using software by backing up and later restoring part of the information on the recording medium 300. Users can back up an encrypted software key/execution number of a program recorded on the recording medium 300, execute the program a number of times, and then restore the backed-up copy of the encrypted software key/execution number. Execution of the software will thereafter be permitted according to this restored software key/execution number, so that users will be able to execute the software program in excess of the permitted number of executions.

The following is a detailed description of the illegal use of software in the above software executing system. FIG. 5 shows a specific example of the processing by the executing apparatus 400 and the changes in the data on the recording medium 300 that accompany the execution of the software program $S_A$ in the above software executing system. FIG. 6 is a first drawing showing illegal usage of a conventional software execution system, while FIG. 7 is a second drawing showing illegal usage.

In the example in FIG. 5, the value "09185501" (in base 10) is used as supplementary key $R_A$, the value "11119442" is used as the software key $K_A$, the value "02834370" as the random number R, and the value "97477116" as the random number R'. These supplementary keys, software keys and random numbers are used as decryption and encryption keys by the respective decrypting units and encrypting units when performing predetermined decryption and encryption algorithms.

In this conventional software executing system, the execution of the software program $S_A$ is accompanied by the execution number updating unit 407 updating the execution number $n_A$ (=5) to the updated execution number $n_A'$ (=4). The first encrypting unit 408 encrypts this updated execution number $n_A'$ along with the software key $K_A$ using the supplementary key $R_A$ and stores the result on the recording medium 300, so that the encrypted software key/execution number $E(R_A, (K_A,n_A))$ on the recording medium 300 is replaced with the encrypted software key/execution number $E(R_A, (K_A,n_A'))$.

When the software program $S_A$ is executed, the random number updating unit 412 updates the random number R to the random number R'. This updated random number R' is then used to encrypt the supplementary key $R_A$ and the result is stored on the recording medium 300. As a result, the encrypted supplementary key $E(R,R_A)$ is replaced with the encrypted supplementary key $E(R',R_A)$.

As shown in FIG. 6, the software execution procedure described above (FIG. 3) updates the encrypted software key/execution number and the encrypted supplementary key updating procedure (FIG. 4) updates the encrypted supplementary keys.

When the software program $S_A$ is executed for the first time, the software execution procedure updates the encrypted software key/execution number. $E(R_A, (K_A,n_A'))$ where $n_A'=n_A-1$ (see columns (a) and (b) in FIG. 6), while the encrypted supplementary key updating procedure updates the encrypted supplementary key from $E(R_0,R_A)$ to $E(R_1,R_A)$ where $R_1 \neq R_0$. Here, assume that the encrypted software key/execution number $E(R_A, (K_A,n_{A1}))$ is recorded ("backed up") by a given information recording apparatus (see columns (b) and (c) in FIG. 6).

As shown in FIG. 7, when the software program $S_A$ is executed for a $k^{th}$ time (the software program $S_A$ having already been executed k−2 times where k is an integer that is two or greater), the software execution procedure updates the encrypted software key/execution number from $E(R_A, (K_A,n_{A(k-1)}))$ where $n_{A(k-1)}=n_{A0}-k+1$ to $E(R_A, (K_A,n_{Ak}))$ where $n_{Ak}=n_{A0}-k$ (see columns (a) and (b) in FIG. 7). The encrypted supplementary key updating procedure updates the encrypted supplementary key from $E(R_{k-1},R_A)$ to $E(R_k, R_A)$, where $R_{k-1} \neq R_0, R_1, \ldots, R_{k-2}$ and $R_k \neq R_0, R_1, \ldots, R_{k-1}$ (see columns (b) and (c) in FIG. 7)

Assume that after the software program $S_A$ has been executed for the $k^{th}$ time, the user restores the backed-up encrypted software key/execution number $E(R_A, (K_A,n_{A1}))$ onto the recording medium 300 (see column (d) in FIG. 7). An executing apparatus 400 with the construction and operation shown in FIGS. 1 to 4 will end up executing the software program $S_A$ in accordance with the illegally restored encrypted software key/execution number $E(R_A, (K_A,n_{A1}))$, resulting in the user executing the software program $S_A$ more that the permitted number of times. By repeating this restoring of the encrypted software key/execution number $E(R_A, (K_A,n_{A1}))$, the user can completely invalidate the setting of the execution number and can execute software on the recording medium as many times as he or she likes.

SUMMARY OF THE INVENTION

In view of the problems with the conventional art, it is a first object of the present invention to provide a data usage controlling system that prevents users from illegally using main data by backing up condition information, such as limitations on the usage of the main data, and then restoring the backed-up copy of the condition information after making several uses of the main data.

The data usage controlling system of the present invention (1) reads (a) main data, (b) a type 2 key that has been encrypted using a type 1 key, and (c) condition information that has been encrypted using the type 2 key from a recording medium. The data usage controlling system also reads the type 1 key from a predetermined storage unit, decrypts the condition information using the type 2 key, and subsequently controls usage of the main data read from the recording medium in accordance with the decrypted condition information.

In accordance with the usage of the main data, the data usage controlling system updates the condition information, generates a new type 2 key, updates the stored type 1 key, encrypts the condition information using the newly generated type 2 key, and replaces the encrypted type 2 key on the recording medium. The data usage controlling system also encrypts the newly generated type 2 key using the updated type 1 key and replaces the encrypted type 2 key on the recording medium.

If the user backs up the condition information (including the execution number) on a certain information recording apparatus and restores the backed-up copy after making several uses of the main data, the supplementary key that was used to encrypt the restored condition information will differ from the supplementary key stored on the recording medium, so that the present data usage controlling system is capable of preventing users from making conventionally possible illegal operations in which main data is made usable by changing the originally set condition information by restoring a backed-up copy of the condition information.

Another data usage controlling apparatus of the present invention reads (a) main data, (b) a type 2 key that has been encrypted using a type 1 key, and (c) condition information that has been encrypted using the type 2 key from a recording medium storing n (where n is an integer no less than two) sets of main data, a type 2 key, and condition information. The data usage controlling system also reads the type 1 key from a predetermined storage unit, decrypts the condition information using the type 2 key, and controls usage of the read main data in accordance with the decrypted condition information.

This data usage controlling apparatus generates a new type 2 key in accordance with usage of the main data, encrypts the decrypted condition information using the new type 2 key and replaces the encrypted condition information on the recording medium with the newly encrypted condition information. The data usage controlling apparatus also, decrypts all (n-1) encrypted type 2 keys on the recording medium that are not the updated type 2 key using the type 1 key, updates the type 1 key after all (n-1) encrypted type 2 keys have been decrypted, encrypts all n type 2 keys using the updated type 1 key, and replaces all n encrypted type 2 keys on the recording medium with the newly encrypted type 2 keys.

As a result, the type 2 keys that are used to encrypt the condition information are updated in accordance with the usage of the main data, thereby achieving greater protection against the copying and alteration of the condition information than was conventionally possible. This means that the illegal usage of the main data through the alteration of the initially set condition information (such as an expiry date, number of executions, or specified region of use) is prevented for a recording medium storing a plurality of sets of main data.

Here, the data usage controlling system may update the decrypted condition information in accordance with the use of the main data, encrypts this new condition information using the newly generated type 2 key, and use the resulting encrypted condition information to replace the encrypted condition information on the recording medium.

As a result, the present data usage controlling system is capable of preventing the conventionally possible illegal usage of main data on a recording medium, which stores a plurality of sets of main data, wherein a user restores a backed-up copy of the condition information.

BRIEF DESCRIPTION OF THE DRAWINGS

These and other objects, advantages and features of the invention will become apparent from the following description taken in conjunction with the accompanying drawings which illustrate a specific embodiment of the invention. In the drawings.

DESCRIPTION OF THE PREFERRED EMBODIMENT

The following describes a digital content usage controlling apparatus that is an embodiment of the present invention, with reference to the attached drawings.

Figure 8:
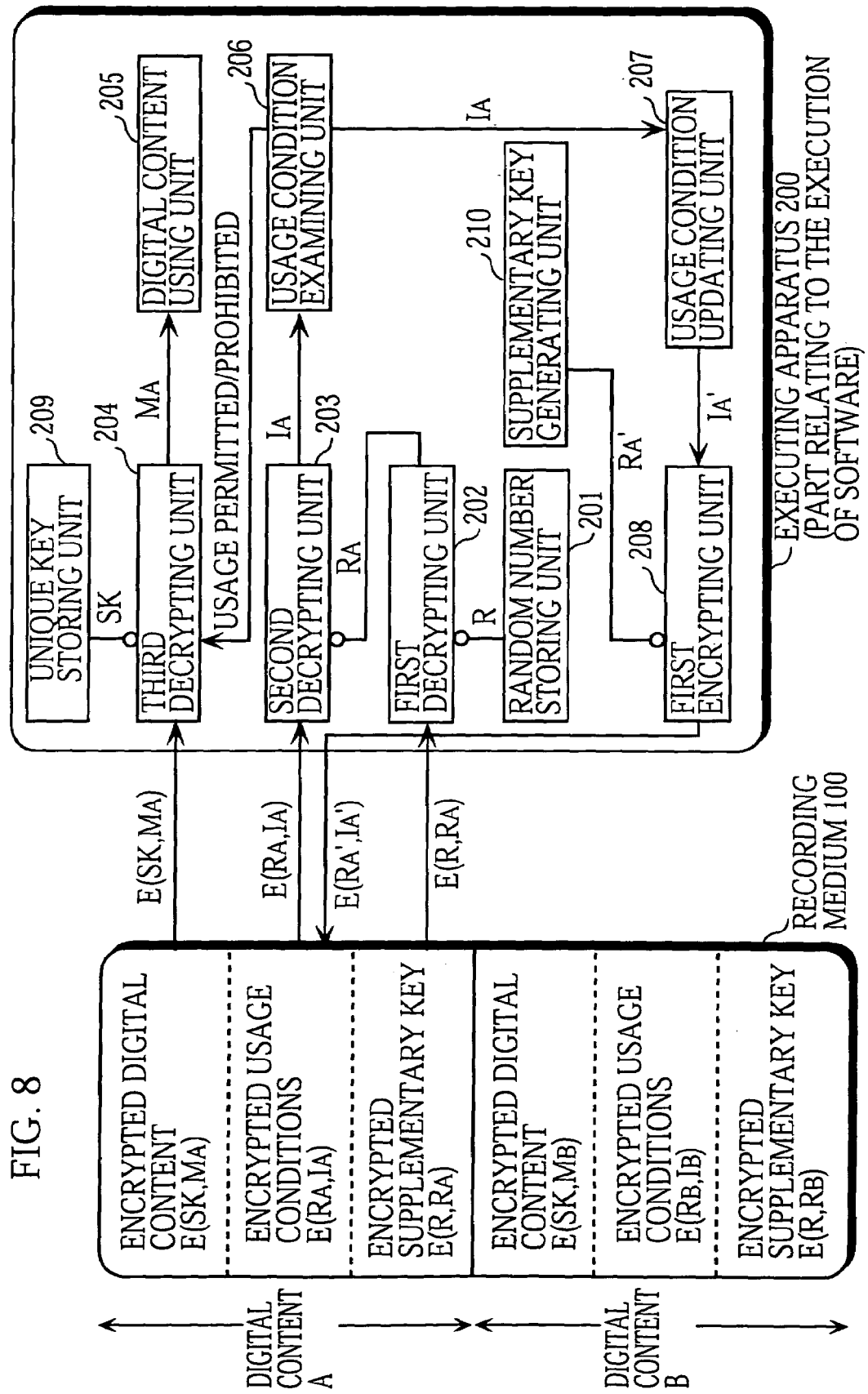
FIG. 8 is a first block diagram showing a recording medium 100 and an executing apparatus 200 in a digital content usage controlling system that is one embodiment of the present invention.
Figure 9:
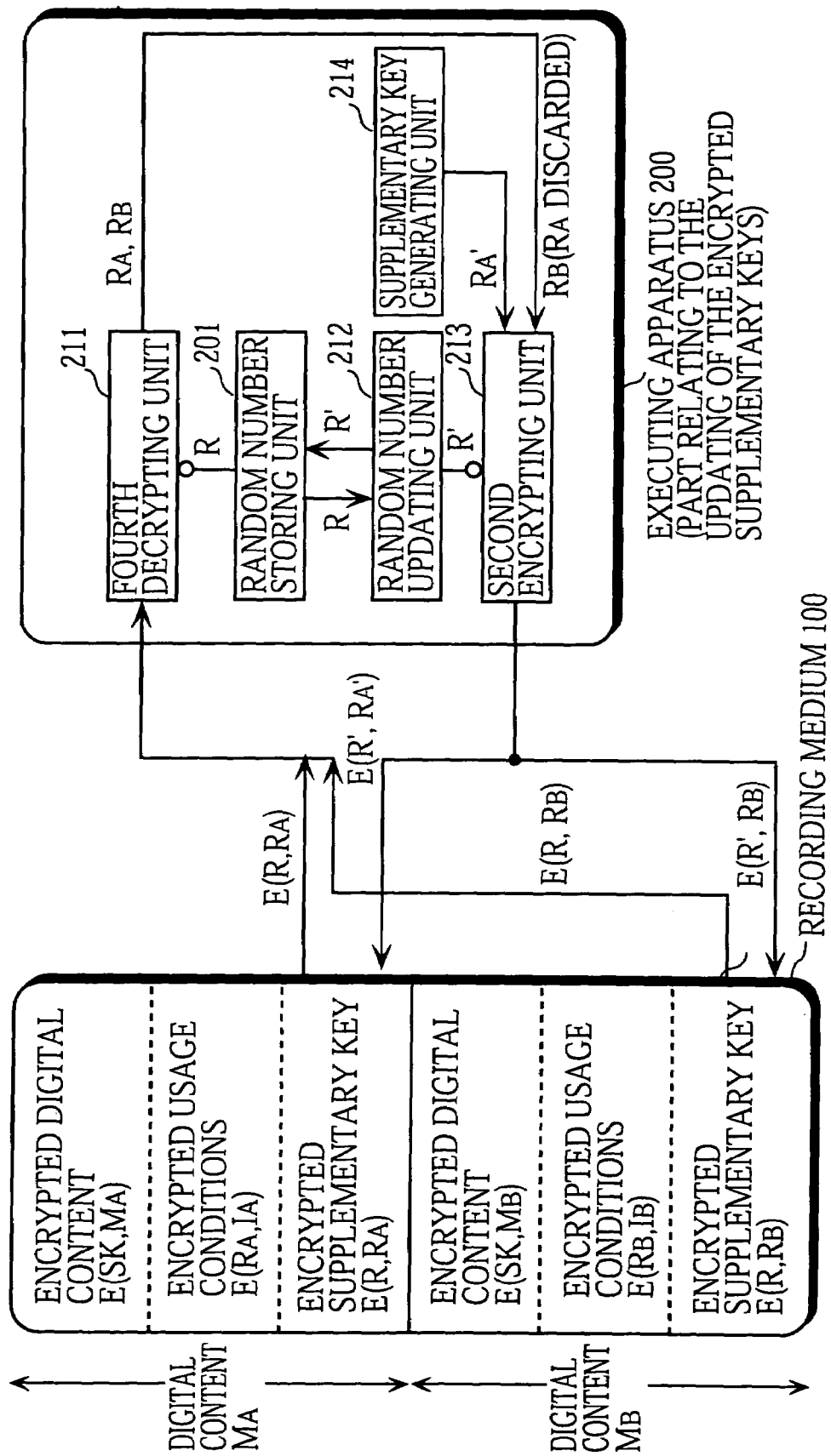
FIG. 9 is a second block diagram showing the recording medium 100 and the executing apparatus 200 in this digital content usage controlling system.

FIG. 8 is a first block diagram showing a recording medium 100 and an executing apparatus 200 in a digital content usage controlling system that is one embodiment of the present invention, while FIG. 9 is a second block diagram showing the recording medium 100 and the executing apparatus 200 in this digital content usage controlling system.

Like the software executing system described in the related art, the executing apparatus 200 of the present digital content usage controlling system is described as being divided into a part, shown in FIG. 8, that is involved in the usage of digital content and a part, shown in FIG. 9, that is involved in the updating of the encrypted supplementary keys on the recording medium. It should be remembered, however, that both these parts are included in the same apparatus.

As shown in FIG. 8, the present digital content usage controlling system includes a recording medium 100 and an executing apparatus 200. The recording medium 100 is a hard-disk drive (HDD) or the like, and stores a number of digital contents that can be digitized images, audio or the like. The executing apparatus 200 is composed of typical computer components, such as a CPU, a RAM, a ROM, an HDD etc., and selectively uses (here, reproduces) one digital content at a time in accordance with a user's instruction. Note that the separate operational units shown in FIGS. 8 and 9 can be achieved in part or in whole by software.

In more detail, the recording medium 100 stores the following information for the digital content $M_A$:

(1) an encrypted copy $E(SK,M_A)$ produced by encrypting the digital content $M_A$ using the key SK that is unique to the executing apparatus 200 (the copy hereafter being referred to as the "encrypted digital content $E(SK,M_A)$");

(2) encrypted usage conditions $E(R_A,I_A)$ produced by encrypting the usage conditions $I_A$ of the digital content $M_A$ using a supplementary key $R_A$ that is unique to the digital content $M_A$; and (3) an encrypted supplementary key $E(R,R_A)$ produced by encrypting the supplementary key $R_A$ using a random number R.

The recording medium 100 similarly stores the following information for the digital content $M_B$:

(1) an encrypted copy $E(SK,M_B)$;
(2) encrypted usage conditions $E(R_B,I_B)$; and
(3) an encrypted supplementary key $E(R,R_B)$.

The usage conditions $I_A$ and $I_B$ are each composed of information limiting the usage of the digital contents $M_A$ and $M_B$, such as an expiry date, a permitted number of executions, and/or a region of use. The digital contents $M_A$ and $M_B$ are therefore reproduced in accordance with these usage conditions $I_A$ and $I_B$.

The part of the executing apparatus 200 that relates to the usage (e.g., reproduction) of digital contents includes the following functional components. A random number storing unit 201 stores a random number in a manner that prevents its stored content being read or changed from outside the executing apparatus 200. This random number storing unit 201 can be composed of a circuit that does not have an interface allowing access from outside the executing apparatus 200. A first decrypting unit 202 decrypts an encrypted supplementary key stored on the recording medium 100 using the random number stored in the random number storing unit 201 to obtain a supplementary key. A second decrypting unit 203 decrypts the encrypted usage conditions on the recording medium 100 using the supplementary key obtained by the first decrypting unit 202 to obtain the usage conditions. A unique key storing unit 209 stores the unique key SK, considered a type 3 key for encryption and decryption, in a manner which prevents the unique key from being read or written from outside the executing apparatus 200. A third decrypting unit 204 decrypts an encrypted digital content using the unique key stored in the unique key storing unit 209 to obtain a digital content. A digital content using unit 205 uses the digital content ("using" meaning "reproducing" in the case of audio or image information) decrypted by the third decrypting unit 204. A usage condition examining unit 206 examines the usage conditions decrypted by the second decrypting unit 203 when a digital content is to be used, judges whether the usage of the digital content is permitted, and informs the third decrypting unit 204 whether or not decrypting is permitted for the digital content. A usage condition updating unit 207 updates the usage conditions, such as the remaining number of permitted executions, in accordance with the usage of digital contents. A supplementary key generating unit 210 generates a new supplementary key in accordance with the usage of digital contents. A first encrypting unit 208 uses the supplementary key generated by the supplementary key generating unit 210 to encrypt the usage conditions, which have been updated by the usage condition updating unit 207, and so updates the encrypted usage conditions on the recording medium 100.

As shown in FIG. 9, the part of the executing apparatus 200 that relates to the updating of the encrypted supplementary key includes the following functional components. A fourth decrypting unit 211 decrypts the encrypted supplementary key of each digital content stored on the recording medium 100 using the random number stored in the random number storing unit 201, and so obtains the supplementary key of each digital content. A random number updating unit 212 updates the random number stored in the random number storing unit 201. A second encrypting unit 213 uses the random number updated by the random number updating unit 212 to encrypt the supplementary key ($R_A$' in FIG. 9) generated by the supplementary key generating unit 210 and the supplementary keys (here, $R_B$) of all digital contents on the recording medium 100 except for the digital content that has just been used, before storing the encrypted supplementary keys onto the recording medium 100 to update the encrypted supplementary key of each digital content.

Like the executing apparatus 400 described in the related art, this executing apparatus 200 with the construction shown in FIGS. 8 and 9 performs a digital content using procedure to selectively use a digital content and update the usage conditions on the recording medium 100 and an encrypted supplementary key updating procedure to update the encrypted supplementary keys on the recording medium 100 at an appropriate timing.

Figure 10:
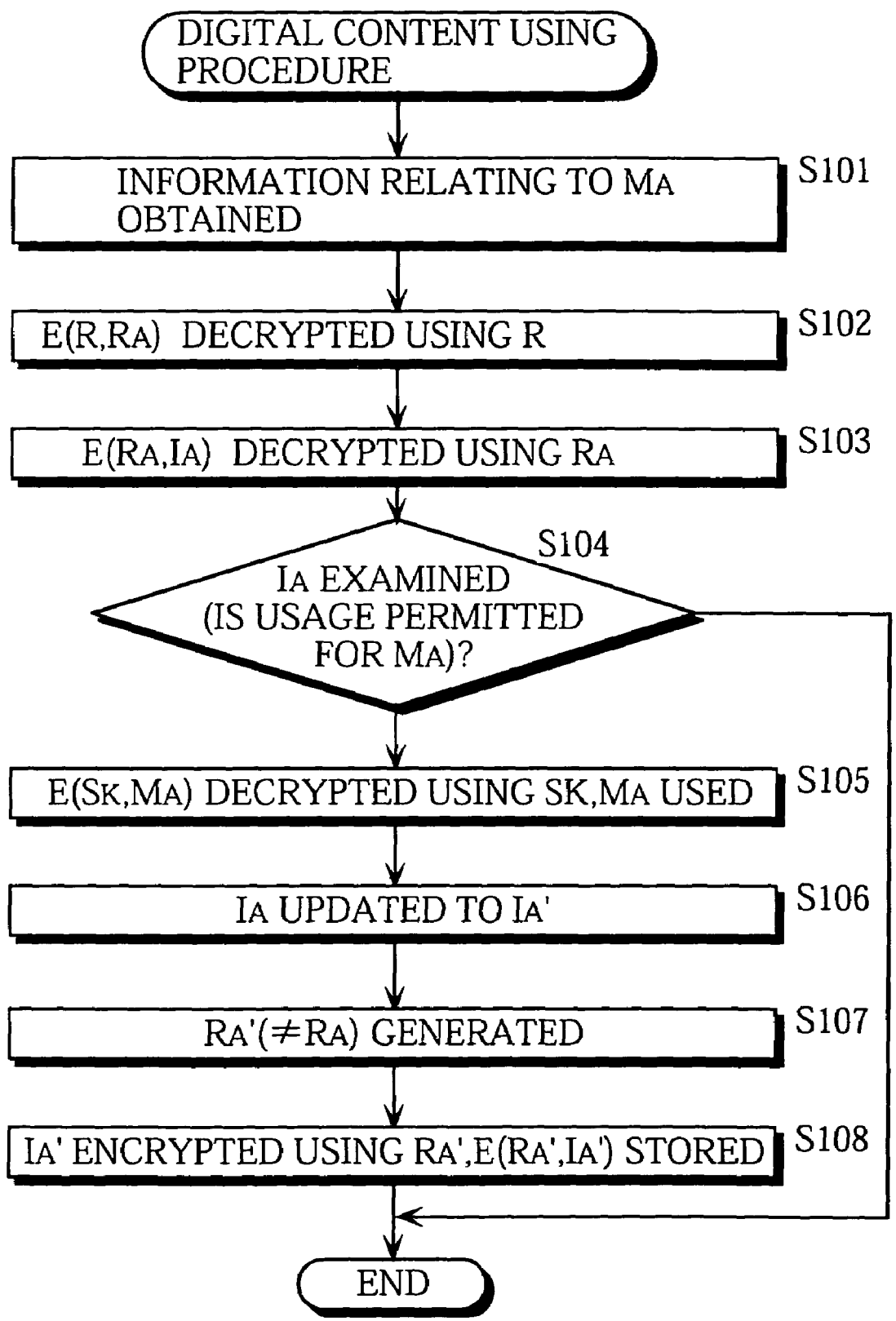
FIG. 10 is a flowchart showing the digital content using procedure performed by the executing apparatus 200.
Figure 11:
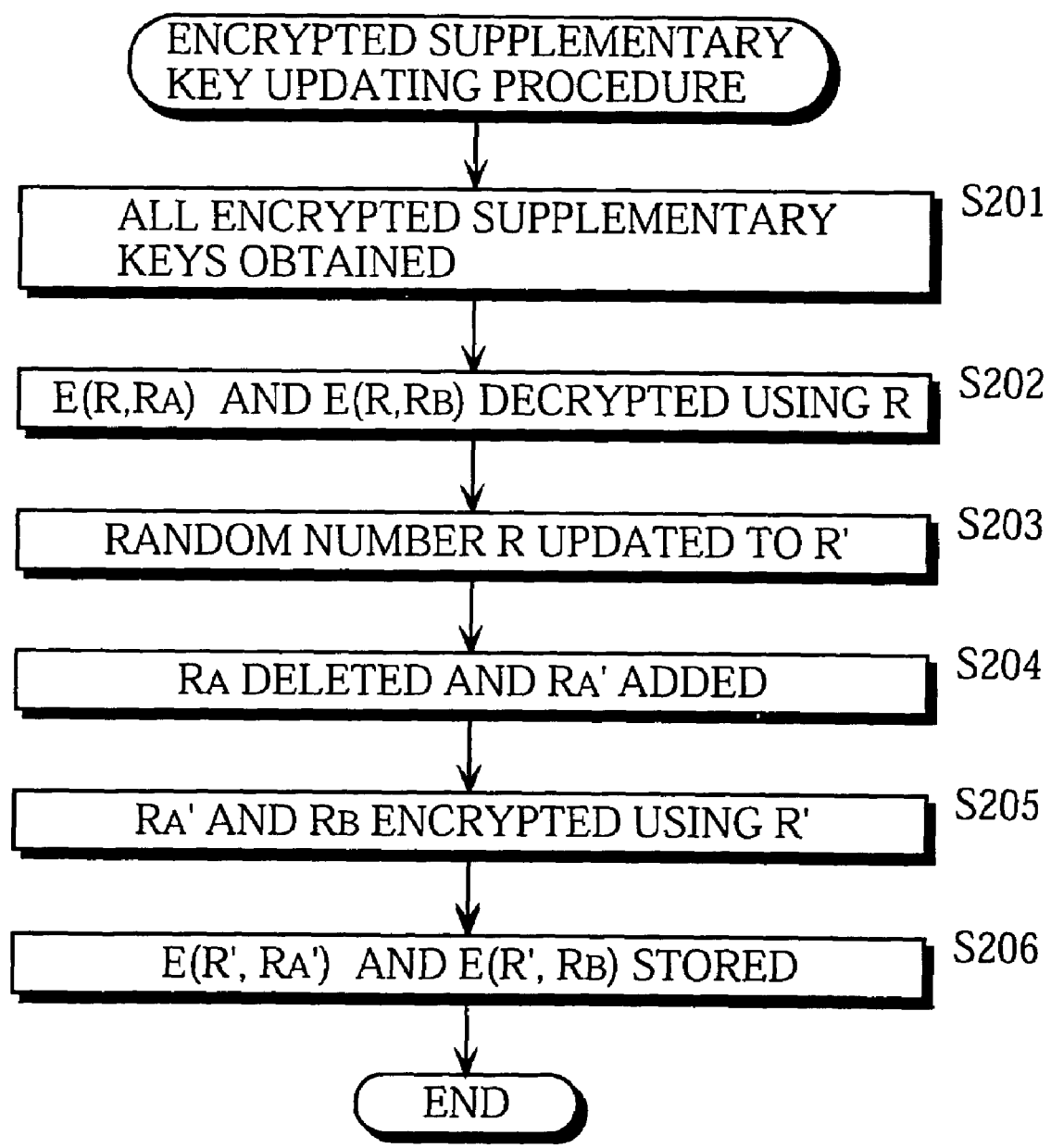
FIG. 11 is a flowchart showing the encrypted supplementary key updating procedure performed by the executing apparatus 200.

FIG. 10 is a flowchart showing the digital content using procedure performed by the executing apparatus 200, while FIG. 11 is a flowchart showing the encrypted supplementary key updating procedure performed by the executing apparatus 200. The illustrated example is for the case where the user has already selected the digital content $M_A$ on the recording medium 100 for reproduction, although the same procedure is used when the digital content $M_B$ is selected.

As shown in FIG. 10, the digital content using procedure starts the information relating to the digital content $M_A$ (i.e., the encrypted supplementary key $E(R,R_A)$, the encrypted usage conditions $E(R_A,I_A)$, and the encrypted digital content $E(SK,M_A)$) being obtained from the recording medium 100 (S101). Next, the first decrypting unit 202 decrypts the encrypted supplementary key $E(R,R_A)$ using the random number R stored in the random number storing unit 201 to obtain the supplementary key $R_A$ (S102). The second decrypting unit 203 then decrypts the encrypted usage conditions $E(R_A,I_A)$ using this supplementary key $R_A$ to obtain the usage conditions $I_A$ (S103).

Next, the usage condition examining unit 206 examines the usage conditions $I_A$ obtained in S103 to see if the limitations regarding the expiry date, number of uses, and region of use etc. are satisfied (S104).

If the usage conditions $I_A$ are not satisfied (S104:No), the usage condition examining unit 206 informs the third decrypting unit 204 that the digital content $M_A$ cannot be used, thereby completing the digital content using procedure.

If the usage conditions $I_A$ are satisfied (S104:Yes), the usage condition examining unit 206 informs the third decrypting unit 204 that the digital content $M_A$ can be used. The third decrypting unit 204 starts to decrypt the encrypted digital content $E(SK,M_A)$ using the unique key SK stored in the unique key storing unit 209 and the digital content using unit 205 starts to use the digital content $M_A$ that is being decrypted (S105). In this case, the digital content $M_A$ is digitized music, so that "using" the digital content $M_A$ means reproducing the music represented by the digital content $M_A$.

This usage of the digital content $M_A$ is accompanied by the usage condition updating unit 207 reducing the execution number by one to update the usage conditions $I_A$ to the usage conditions $I_A$' (S106). The supplementary key generating unit 210 generates a new supplementary key $R_A$' that differs from the supplementary key $R_A$ that was used by the second decrypting unit 203 (S107).

The first encrypting unit 208 encrypts the usage conditions $I_A$' produced in S106 using the supplementary key $R_A$' generated in S107 to produce the encrypted supplementary key. $E(R_A',I_A')$ and stores this onto the recording medium 100 to update the encrypted usage conditions (S108). This completes the digital content using procedure.

As shown in FIG. 11, the encrypted supplementary key updating procedure begins with the executing apparatus 200 obtaining an encrypted supplementary key of each digital content on the recording medium 100 (in this case the encrypted supplementary keys $E(R,R_A)$ and $E(R,R_B)$) (S201). The fourth decrypting unit 211 then decrypts each of these encrypted supplementary keys $E(R,R_A)$ and $E(R,R_B)$ using the random number R stored in the random number storing unit 201 to obtain the supplementary keys $R_A$ and $R_B$ (S202).

Next, the random number updating unit 212 updates the random number R in the random number storing unit 201 to the random number R' (S203). Of the supplementary keys $R_A$ and $R_B$ obtained in S202, the supplementary key $R_A$ that was used to decrypt the usage conditions of the digital content $M_A$ is replaced with the supplementary key $R_A$' generated in S107 (S204). The second encrypting unit 213 encrypts the supplementary keys $R_A$' and $R_B$ using the random number R' that was updated in step S203 (S205), and the resulting encrypted supplementary keys $E(R',R_A')$ and $E(R',R_B)$ are recorded on the recording medium 100 in place of the encrypted supplementary keys $E(R,R_A)$ and $E(R,R_B)$ (S206). This completes the encrypted supplementary key updating procedure.

In this digital content usage controlling system, each supplementary key is stored on the recording medium having been encrypted using a random number, the usage conditions are stored having been encrypted using a supplementary key, and the digital contents are stored having been encrypted using a unique key. This stored information cannot be edited and illegal usage of the digital content is prevented.

The procedures described above result in an updated random number being stored in the executing apparatus 200 and on the recording medium 100 every time a digital content is executed. If a user were to copy all of the information on the recording medium 100, it would not be possible to use the copied recording medium on any executing apparatus apart from the executing apparatus 200. Alternatively, if the user somehow prevented the executing apparatus 200 from updating the information on the recording medium 100, the executing apparatus would not be able to use the recording medium 100 thereafter. This means that the present digital content usage controlling system is capable of preventing certain illegal usage of digital content in the same way as the software executing system described in the related art.

Like the software executing system described in the related art section, the execution apparatus in the present digital content usage controlling system stores only one random number for a number of digital contents on the recording medium. This reduces the size of the inaccessible storage area in the executing apparatus when compared to the case where a different random number (encryption key) is used for each of a number of digital contents, and in turn reduces the cost of manufacturing a device capable of stopping the certain illegal uses of a digital content.

Figure 1:
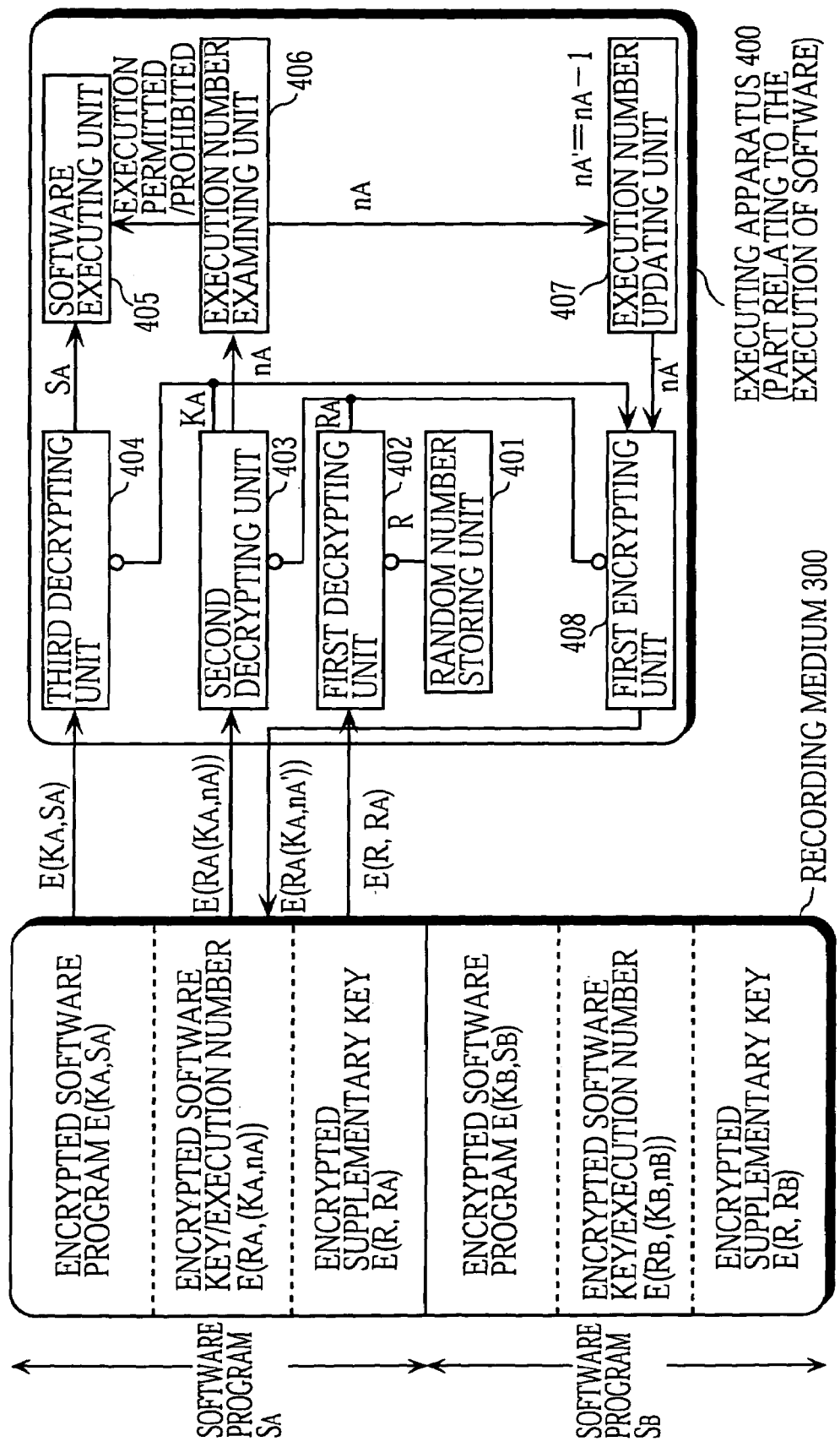
FIG. 1 is a first block diagram showing the composition of a recording medium 300 and an executing apparatus 400 included in a conventional software executing system.
Figure 2:
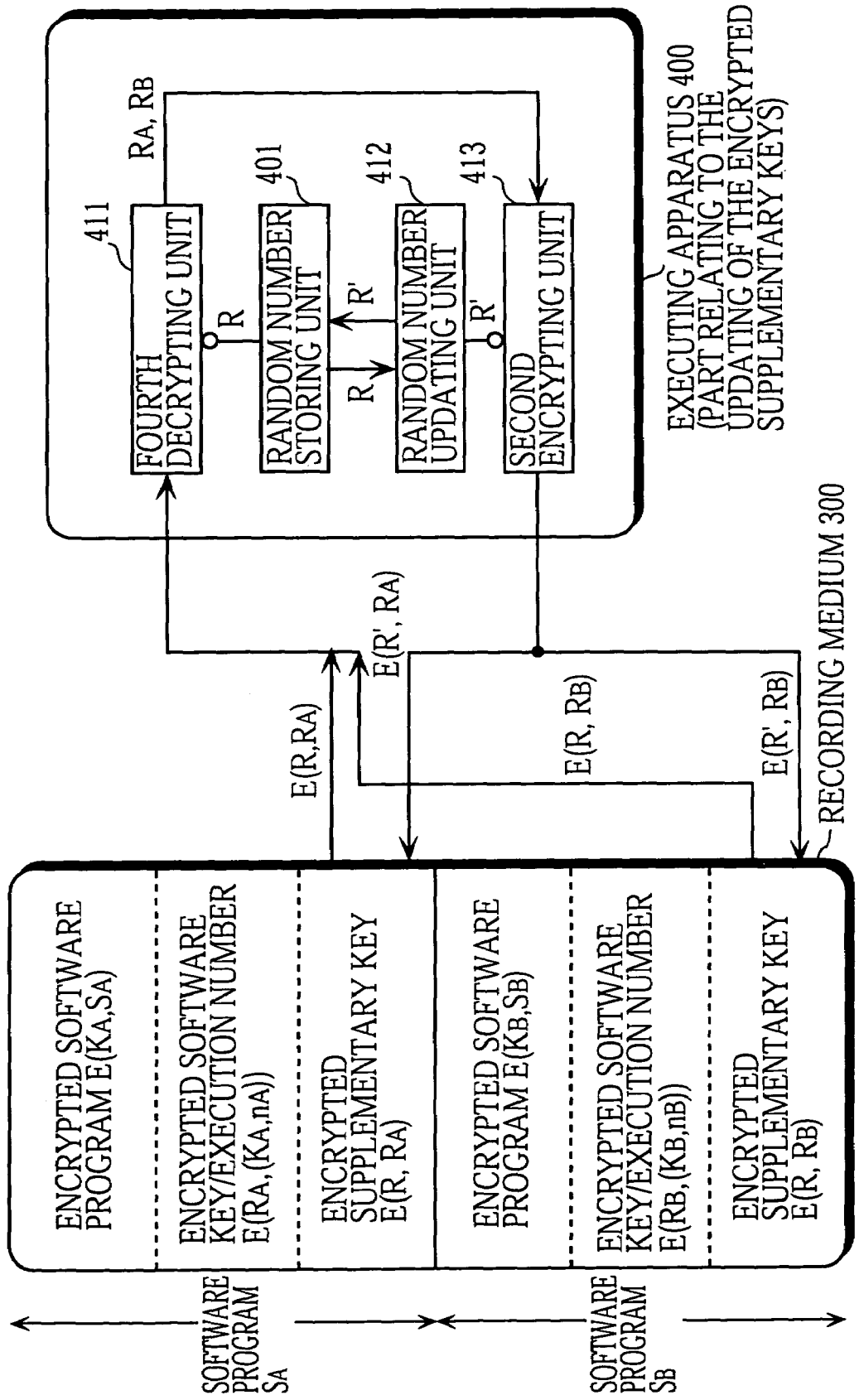
FIG. 2 is a second block diagram showing the compositions of the recording medium 300 and the executing apparatus 400 included in a conventional software executing system.
Figure 3:
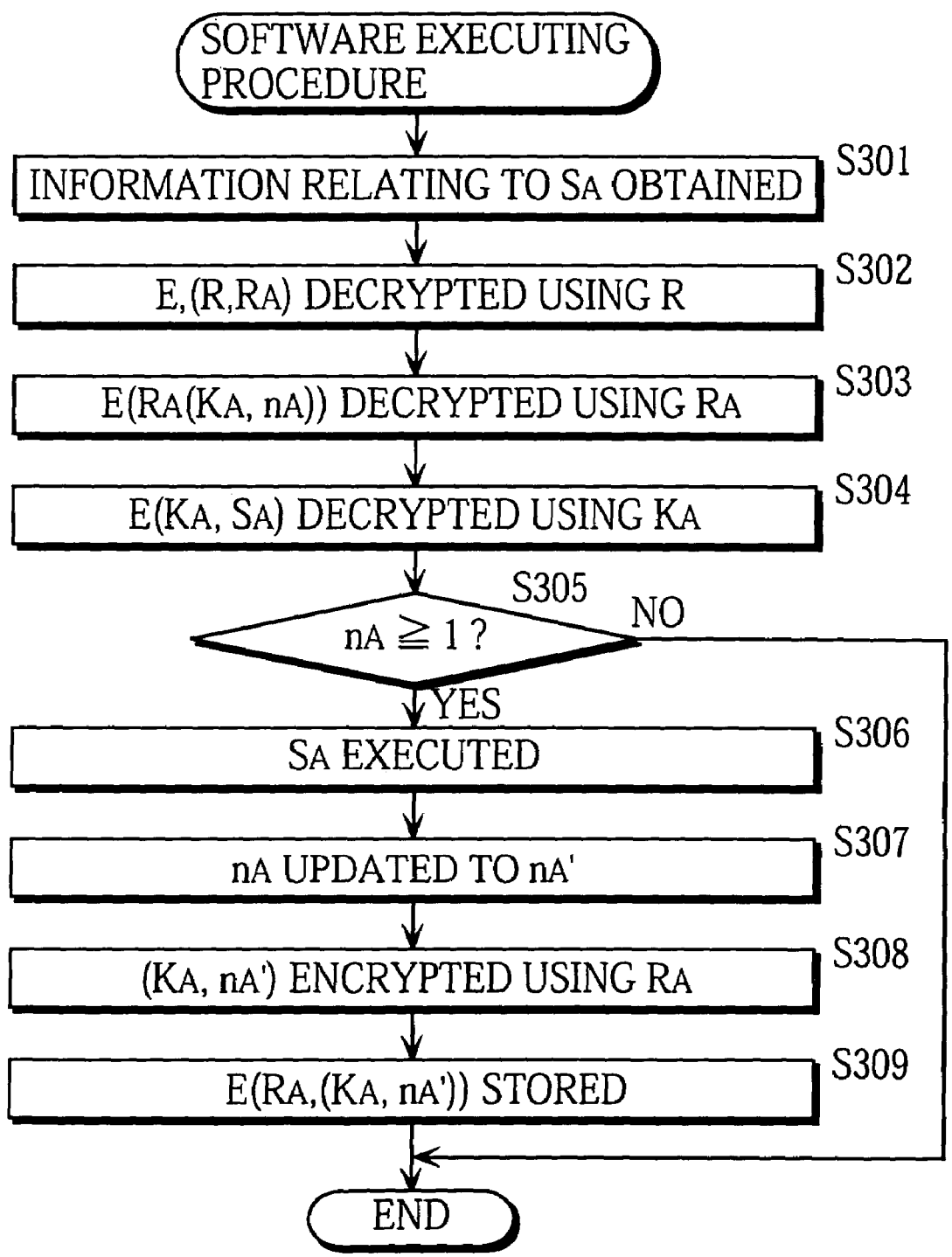
FIG. 3 is a flowchart showing the software execution procedure performed by the executing apparatus 400.
Figure 4:
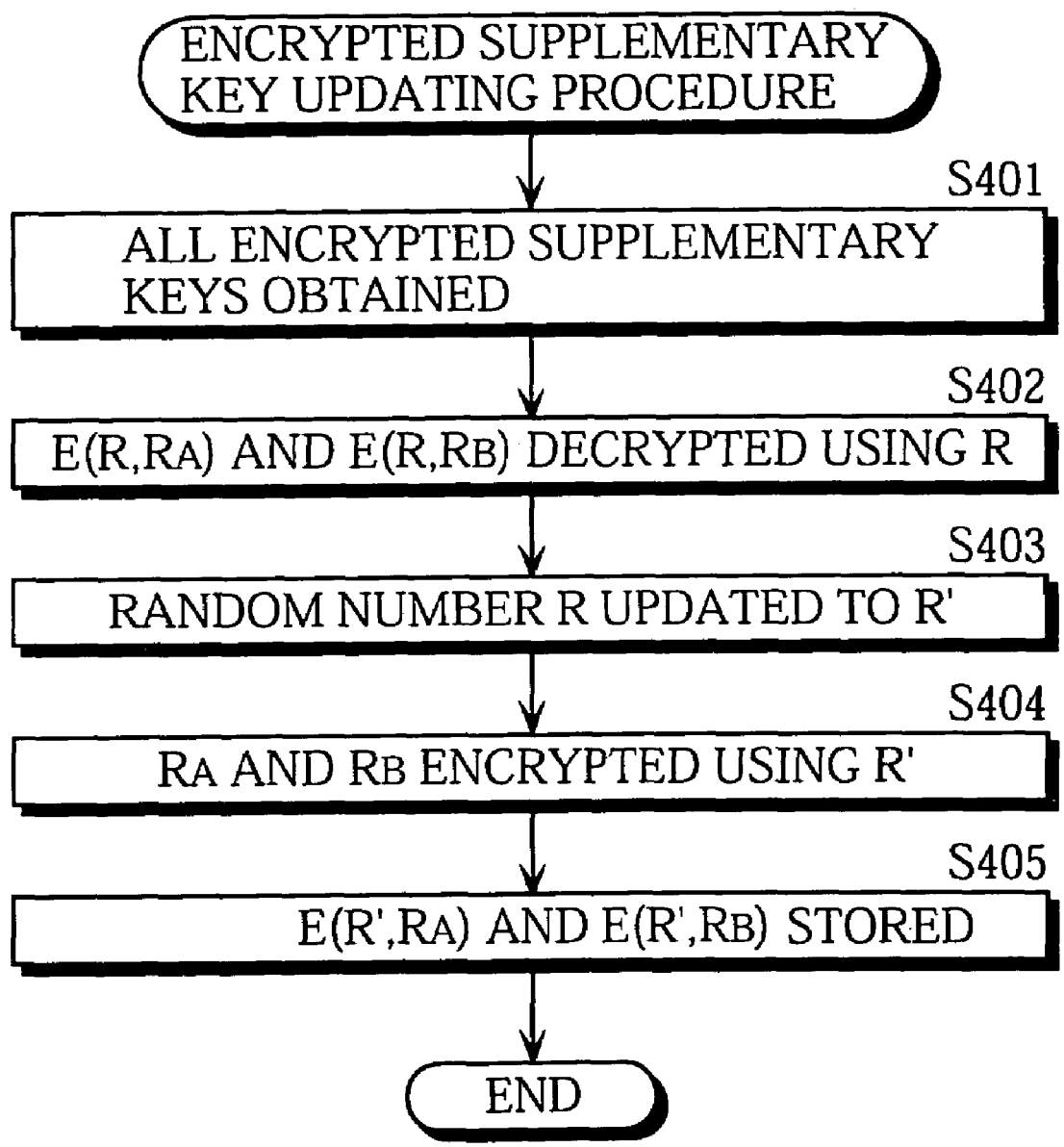
FIG. 4 is a flowchart showing the encrypted supplementary key updating procedure performed by the executing apparatus 400.
Figure 5:
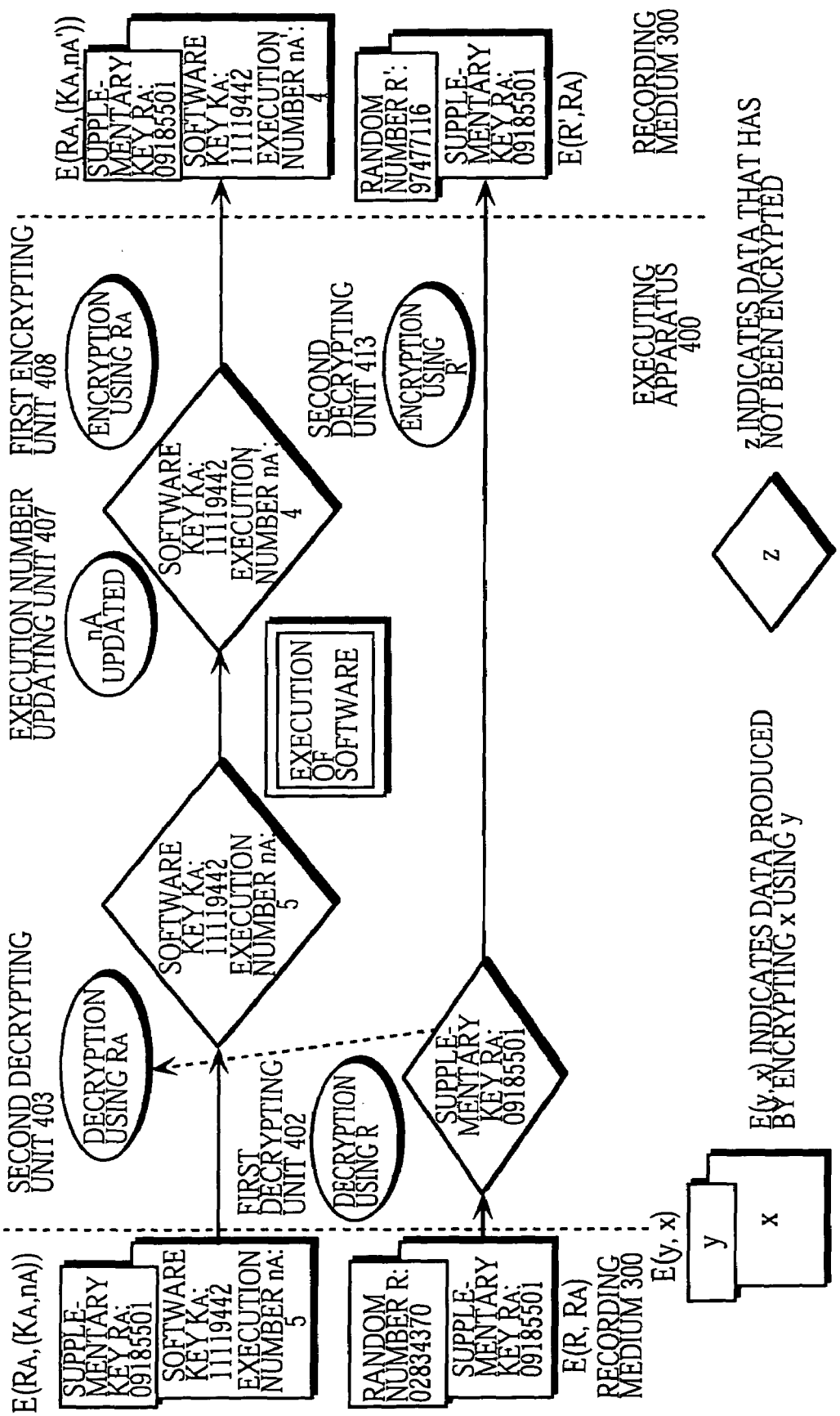
FIG. 5 shows a specific example of the processing by the executing apparatus 400 and the changes in the data on the recording medium 300 that accompany the execution of the software program $S_A$ in this conventional software executing system.
Figure 6:
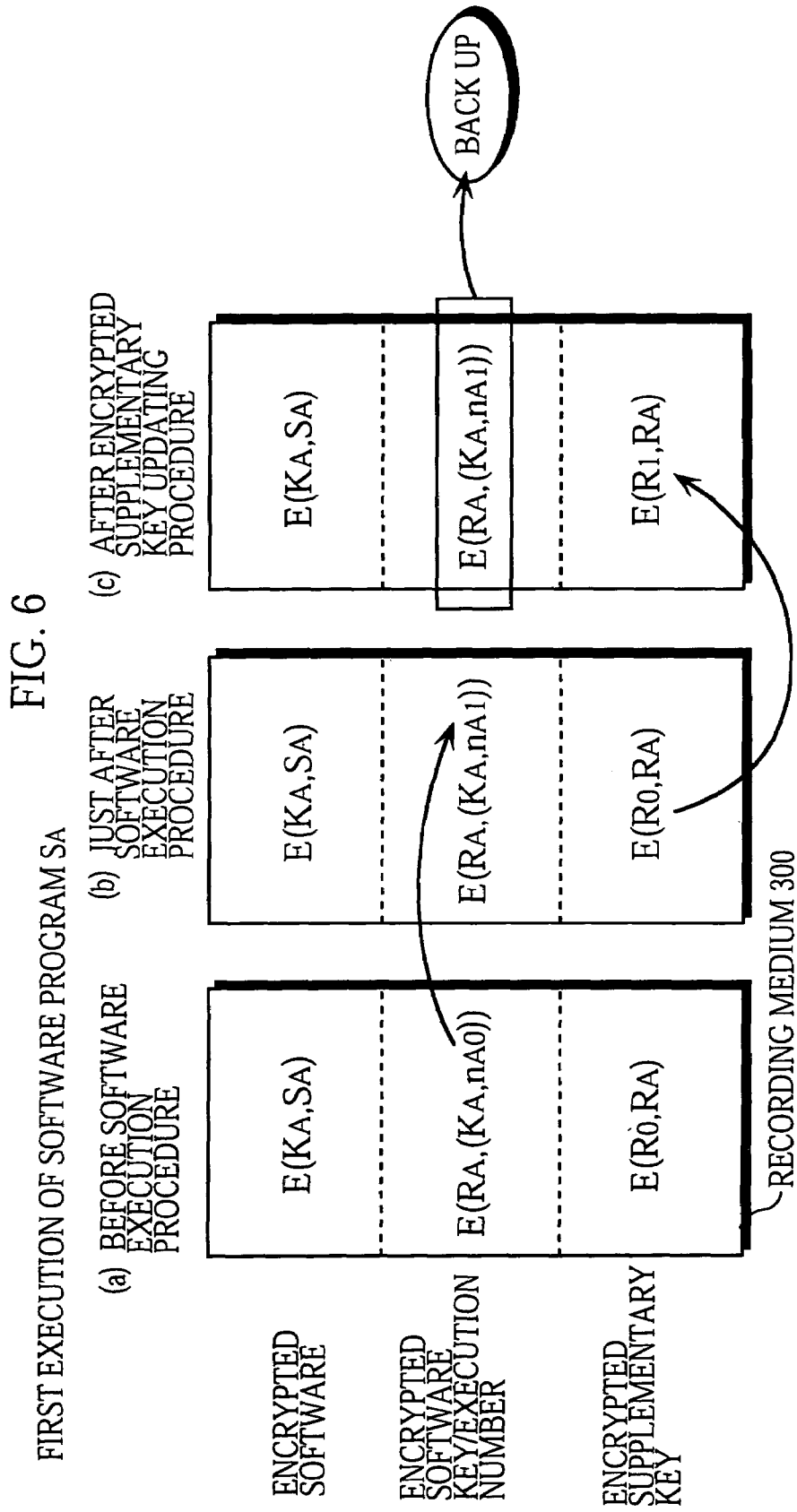
FIG. 6 is a first drawing showing illegal usage of the software program $S_A$ in this conventional software execution system.
Figure 7:
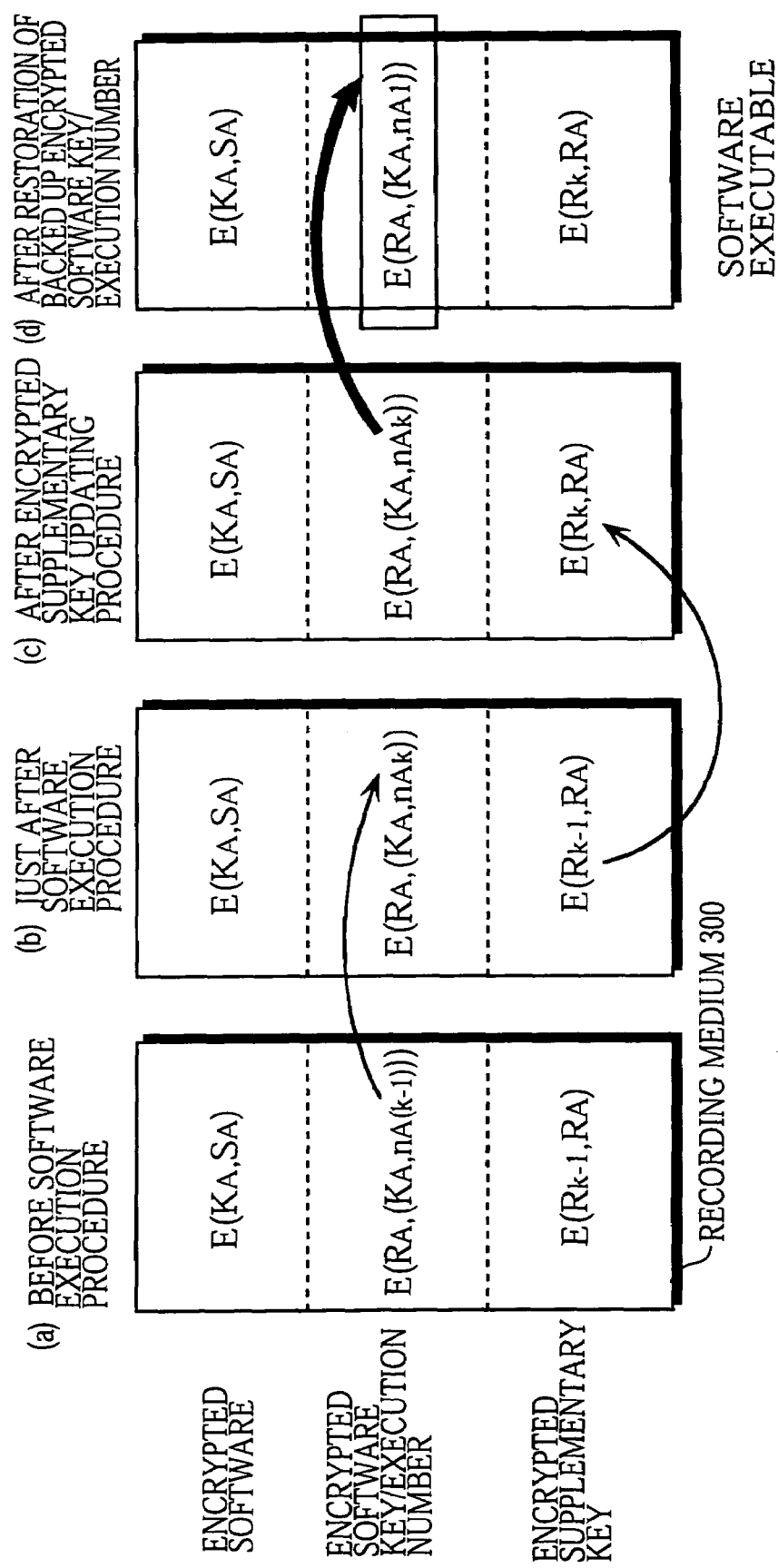
FIG. 7 is a second drawing showing illegal usage of the software program $S_A$.

Unlike the system described in the related art, the present digital content usage controlling system is also capable of preventing the illegal usage of the main data (i.e., digital contents) stored on the recording medium that was described using FIGS. 5 to 7. This illegal usage is the case where a user changes the stored content of the recording medium after several uses of a digital content by restoring a backed-up copy of the usage conditions made previously. This illegal operation would normally enable the user to use the digital content in excess of the permitted number of operations. The following describes how the present digital content usage controlling system stops such illegal operations, with reference to FIGS. 12 to 14, which correspond to FIGS. 5 to 7.

Figure 12:
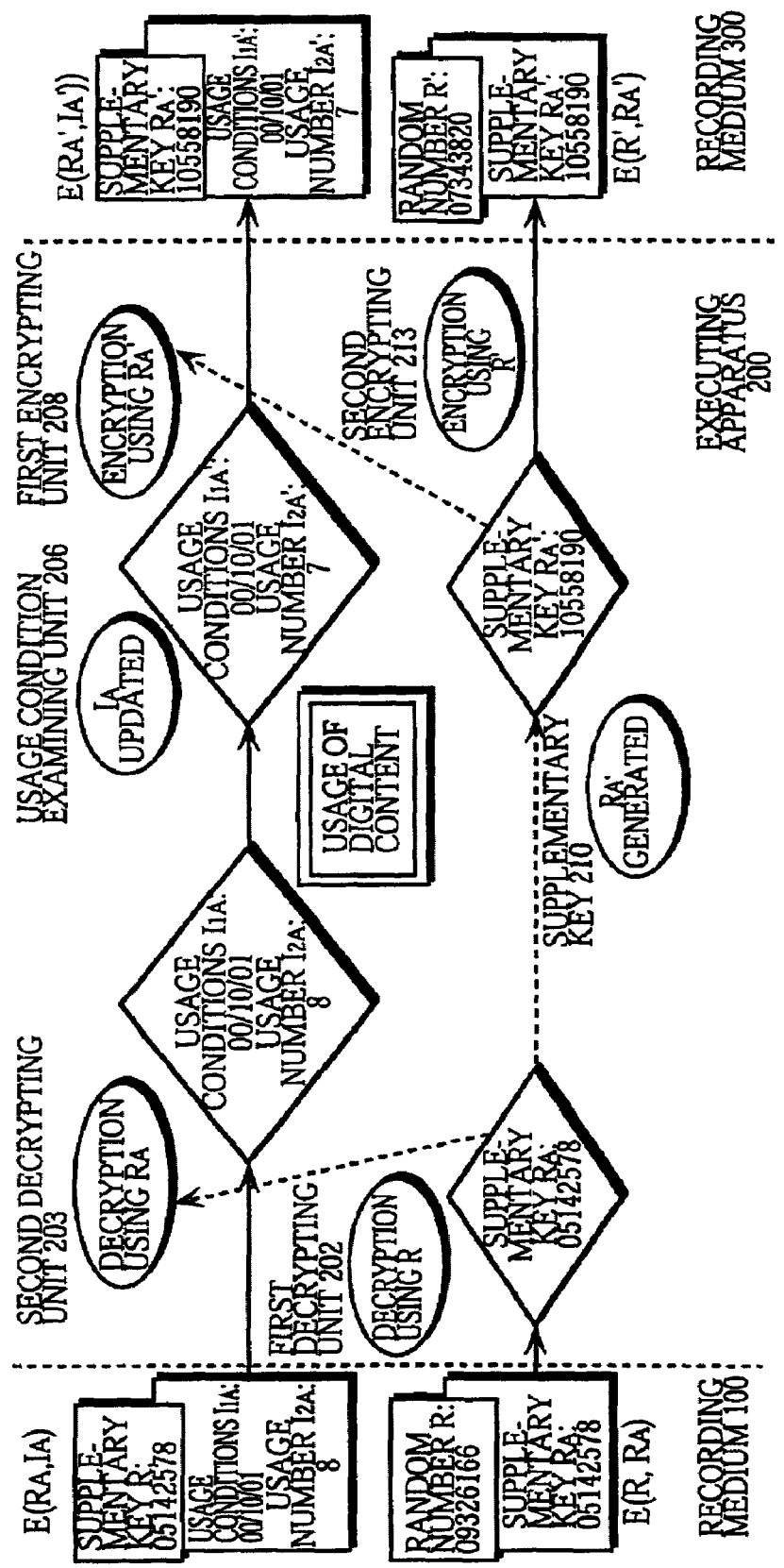
FIG. 12 shows a specific example of the processing of the executing apparatus 200 and the resulting changes to the data on the recording medium 100 that occur when the digital content $M_A$ is used by the present digital content usage controlling system.
Figure 13:
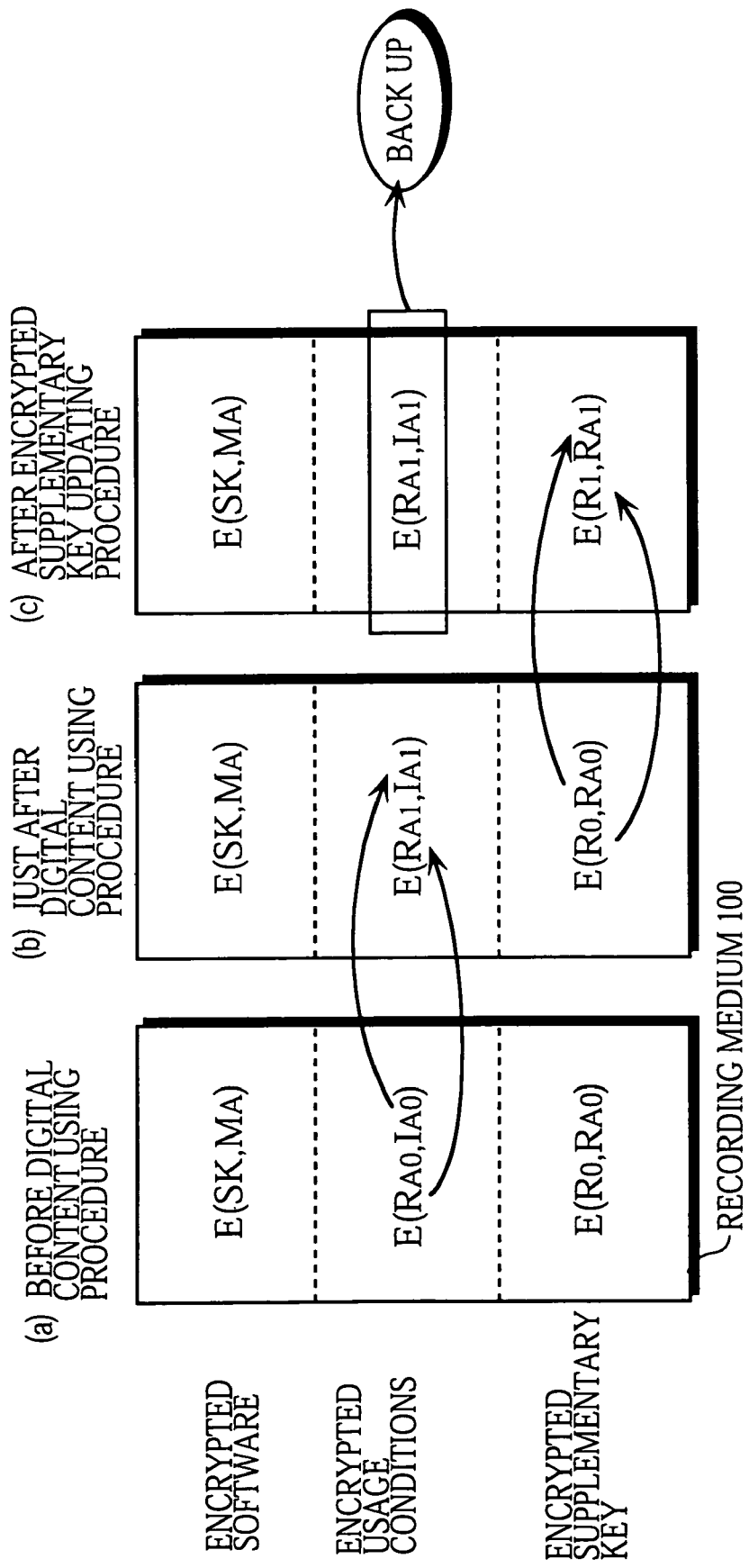
FIG. 13 is a first drawing that is used to explain how the present digital content usage controlling system prevents the illegal usage of digital contents.
Figure 14:
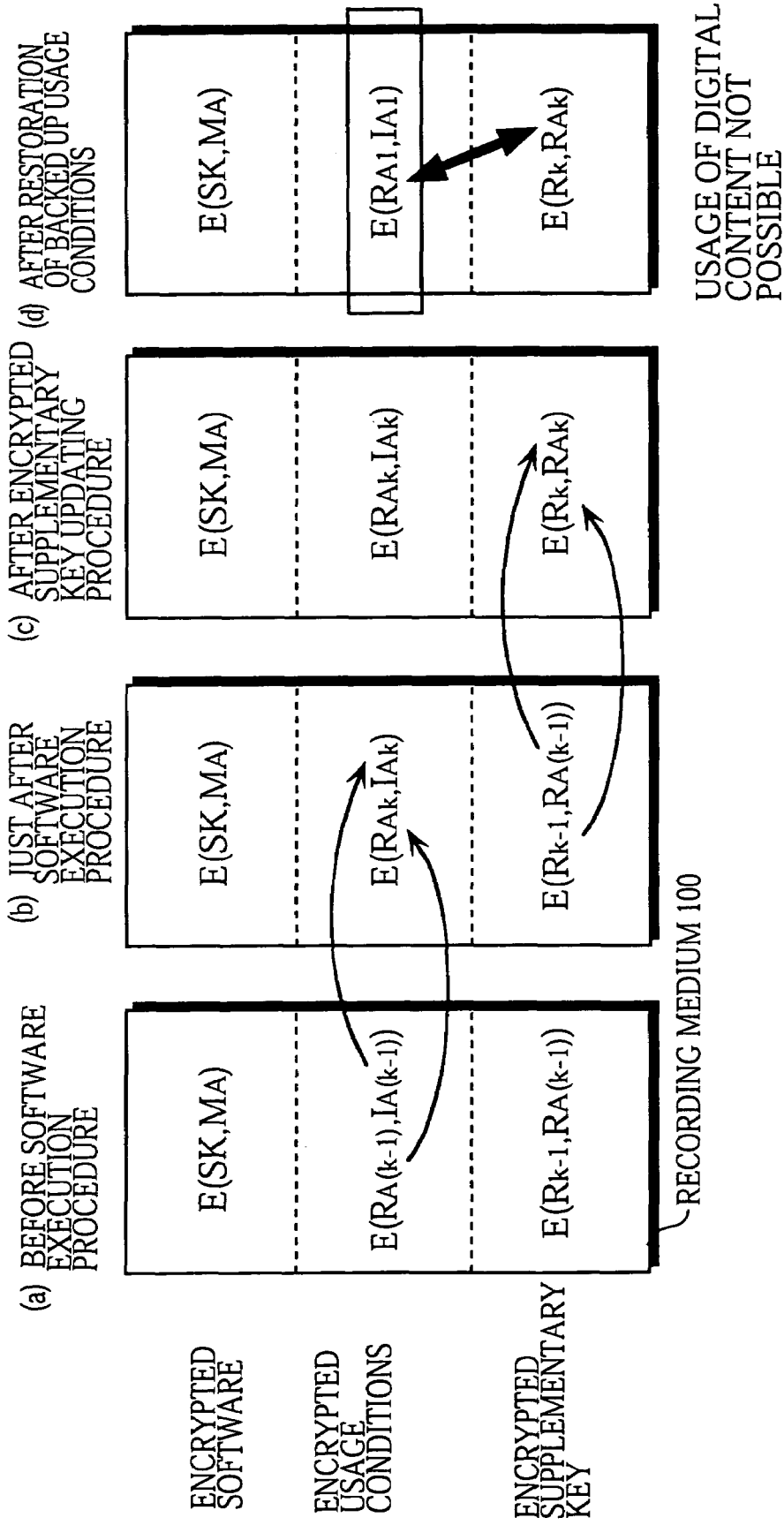
FIG. 14 is a second drawing that will be used to explain how the present digital content usage controlling system prevents the illegal usage of digital contents.

FIG. 12 shows a specific example of the processing of the executing apparatus 200 and the resulting changes to the data on the recording medium 100 that occur when the digital content $M_A$ is used by the present digital content usage controlling system. FIG. 13 is a first drawing and FIG. 14 is a second drawing that will be used to explain how the present digital content usage controlling system prevents the illegal usage of digital contents.

In the example shown in FIG. 12, the supplementary key $R_A$ is assumed to be "05142578" (in base 10), the supplementary key $R_A'$ is assumed to be "10558190", the random number R is assumed to be "09326166", and the random number R' is assumed to be "07343820". The various decrypting (and encrypting) units use these supplementary keys and random numbers as decryption (encryption) keys when performing predetermined encryption (or decryption) algorithms. As an actual example, the encryption keys may be used in block encryption such as DES (Data Encryption Standard).

In the present digital content usage controlling system, the usage of a digital content $M_A$ is accompanied in particular by the following operations. The usage condition updating unit 207 updates the usage number in the usage conditions $I_A$ from $I_{2A}$ (=8) to $I_{2A}'$ (=7). The supplementary key generating unit 210 generates a different supplementary key $R_A'$ to the supplementary key $R_A$ which was read from the recording medium 100 and decrypted. The first encrypting unit 208 encrypts the usage conditions $I_A'$ including the updated usage number $I_{2A}'$ using the generated supplementary key $R_A'$ and stores the result on the recording medium 100, so that the encrypted usage conditions $E(R_A, I_A)$ on the recording medium 100 are updated to the encrypted usage conditions $E(R_A', I_A')$. In accordance with the usage of the digital content $M_A$, the random number updating unit 212 updates the random number R to R'. The second encrypting unit 213 encrypts the generated supplementary key $R_A$ using this updated random number R' and the result is stored on the recording medium 100 so that the encrypted supplementary key $E(R, R_A)$ on the recording medium 100 is updated to $E(R', R_A')$.

As shown in FIG. 13, the encrypted usage conditions are updated by the digital content using procedure (shown in FIG. 10), while the encrypted supplementary keys are updated by the encrypted supplementary key updating procedure (shown in FIG. 11).

When the digital content $M_A$ is used for the first time, the digital content using procedure updates the encrypted usage conditions $E(R_{A0}, I_{A0})$, where the usage conditions $I_{A0}$ include the usage number $I_{2A0}$, to the encrypted usage conditions $E(R_{A1}, I_{A1})$, where the usage conditions $I_{A1}$ include the usage number $I_{2A1}$ (where $I_{2A1} = I_{2A0} - 1$) (see columns (a) and (b) in FIG. 13). The encrypted supplementary key updating procedure then updates the encrypted supplementary key from $E(R_0, RA_0)$ to $E(R_1, R_{A1})$, where $R_1 \neq R_0$ and $R_{A1} \neq R_{A0}$. Assume here that the encrypted usage conditions $E(R_{A1}, I_{A1})$ at this point are backed up by a certain information storage device (see columns (b) and (c) in FIG. 13).

As shown in FIG. 14, when the digital content $M_A$ is used for the $k^{th}$ time (where k is an integer of 2 or more and the preceding uses of the digital content $M_A$ are performed properly), the digital content using procedure updates the encrypted usage conditions $E(R_{A(k-1)}, I_{A(k-1)})$, where the usage conditions $I_{A(k-1)}$ include the usage number $I_{2A(k-1)}$ ($=I_{2A0}-k+1$), to the encrypted usage conditions $E(R_{Ak}, I_{Ak})$, where the usage conditions $I_{Ak}$ include the usage number $I_{2Ak}(=I_{2A0}-k)$ (see columns (a) and (b) in FIG. 14).

The encrypted supplementary key updating procedure updates the encrypted supplementary key from $E(R_{k-1}, R_{A(k-1)})$, where $R_{k-1} \neq R_0, R_1, \ldots, R_{k-2}$ and $R_{A(k-1)} \neq R_{A0}, R_{A1}, \ldots, R_{A(k-2)}$, to $E(R_k, R_{Ak})$, where $R_k \neq R_0, R_1, \ldots, R_{k-1}$ and $R_{A(k)} \neq R_{A0}, R_{A1}, \ldots, R_{A(k-1)}$ (see columns (b) and (c) in FIG. 14).

Even if the user restores the backed-up copy of the encrypted usage conditions $E(R_{A1}, I_{A1})$ onto the recording medium 100 after the digital content $M_A$ has been used for the $k^{th}$ time (see column (d) in FIG. 14), the supplementary key $R_{A1}$ that was used to encrypt the usage conditions $E(R_{A1}, I_{A1})$ will differ from the supplementary key $R_{Ak}$ that is stored on the recording medium 100 as encrypted supplementary key $E(R_k, R_{Ak})$. In this case, the executing apparatus 200 will judge that the encrypted usage conditions $E(R_{A1}, I_{A1})$ and the encrypted supplementary key $E(R_k, R_{Ak})$ for the encrypted digital content $E(SK, M_A)$ are invalid.

In other words, the executing apparatus 200 is capable of preventing illegal uses being made in excess of the original permitted number of uses. Such illegal operations are conventionally possible by using a digital content on a recording medium a number of times and then restoring a backed-up copy of the usage information of the digital content onto the recording medium.

Even if the user backs up both the encrypted usage conditions and the encrypted supplementary key and then restores this information after making several uses of a digital content, the random number used to encrypt the supplementary key will have been updated every time the digital content was used. This means that it will not be possible to use the digital content more than the original set number of uses, such as that given in the usage conditions.

Note that while the present digital content usage controlling system generates a supplementary key every time a digital content is used, a supplementary key may be generated every time a predetermined number of uses have been made of a digital content. The effectiveness of such a system can be increased if this predetermined number is kept secret from users.

In the above digital content usage controlling system, the recording medium is assumed to be a hard disk drive (HDD), a memory card, a DVD-RAM disc or the like, with the above explanation describing the case where all of the mentioned information is recorded on a single recording medium. However, the digital content may be recorded on a first medium (such as a CD-ROM) that is read-only and the encrypted supplementary key and encrypted usage conditions may be stored on a second medium (such as an HDD) that is rewritable.

Part or all of the information can be managed by an information managing apparatus and then obtained from the information managing apparatus by an executing apparatus when necessary. As a particular example, a digital content may be encrypted using a predetermined encryption key which the executing apparatus obtains from the information managing apparatus when using the digital content to enable the executing apparatus to decrypt the digital content.

The above digital content usage controlling system describes the case where the main data recorded on the recording medium are digital contents such as moving images, still images, and audio, with usage of such information amounting to its reproduction by an executing apparatus. However, the information recorded on the recording medium may be computer programs, in which case usage of the information amounts to the execution of the computer programs.

The second decrypting unit in the above digital content usage controlling system is described as using a random number as the encryption key, although this key need not be a random number and instead can be a value which is updated by performing a predetermined calculation, such as by incrementing the current value by one.

While the executing apparatus in the above digital content usage controlling system stores the random number, the random number may instead be stored on the recording medium.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A data usage controlling apparatus that
   (1) reads a type 1 key from a storage unit and
      (a) main data,
      (b) an encrypted type 2 key produced by encrypting a type 2 key using the type 1 key, and
      (c) encrypted condition information produced by encrypting condition information using the type 2 key from a recording medium, the condition information being for use in judging as to whether usage of the main data is permitted and not used as an encryption key,
   (2) decrypts the encrypted condition information using the type 2 key, and
   (3) controls usage of the read main data based on the condition information, the data usage controlling apparatus comprising:
   first updating means for updating the condition information in accordance with usage of the read main data;
   generating means for generating a new type 2 key in accordance with the usage of the read main data;
   first encrypting means for encrypting the updated condition information using the new type 2 key and replacing the encrypted condition information on the recording medium with the encrypted updated condition information;
   second updating means for updating the type 1 key in the storage unit in accordance with the usage of the read main data; and
   second encrypting means for encrypting the new type 2 key using the updated type 1 key and replacing the encrypted type 2 key on the recording medium with the encrypted new type 2 key.

2. A data usage controlling apparatus that
   (1) reads a type 1 key from a storage unit and a set including
      (a) main data,
      (b) an encrypted type 2 key produced by encrypting a type 2 key using the type 1 key, and
      (c) encrypted condition information produced by encrypting condition information using the type 2 key from a recording medium on which n (where n is an integer no less than two) sets of main data, an encrypted type 2 key, and encrypted condition information are recorded, the condition information being for use in judging as to whether usage of the main data is permitted and not used as an encryption key,
   (2) decrypts the encrypted condition information using the type 2 key, and
   (3) controls usage of the read main data based on the condition information, the data usage controlling apparatus comprising:
   generating means for generating a new type 2 key in accordance with usage of the main data;
   first encrypting means for encrypting the condition information using the new type 2 key and replacing the encrypted condition information on the recording medium with the newly encrypted condition information;
   decrypting means for decrypting all (n-1) encrypted type 2 keys on the recording medium that are not included in the read set using the type 1 key;
   updating means for updating the type 1 key in the storage unit after the decrypting means has decrypted all (n-1) encrypted type 2 keys; and
   second encrypting means for encrypting the (n-1) type 2 keys and the new type 2 key using the updated type 1 key and replacing all n encrypted type 2 keys on the recording medium with the newly encrypted type 2 keys.

3. A data usage controlling apparatus in accordance with claim 2, further comprising:
   second updating means for updating the condition information in accordance with usage of the read main data,
   wherein the first encrypting means encrypts the updated condition information using the new type 2 key and replaces the encrypted condition information on the recording medium with the encrypted updated condition information.

4. A data usage controlling apparatus in accordance with claim 3,
wherein the generating means generates a new type 2 key every time a user makes a predetermined number of uses of the main data on the recording medium, and when the generating means has not generated a new type 2 key, the first encrypting means re-encrypts the updated condition information using a same type 2 key as was used to decrypt the encrypted condition information.

5. A data usage controlling apparatus in accordance with claim 2,
wherein the main data in each set on the recording medium has been encrypted using a type 3 encryption key, the data usage controlling apparatus further comprising:
obtaining means for obtaining the type 3 encryption key; and
second decrypting means for decrypting the read main data using the obtained type 3 encryption key.

6. A data usage controlling apparatus in accordance with claim 2,
wherein the main data in each set on the recording medium has been encrypted using a type 3 encryption key that is unique to the data usage controlling apparatus, the data usage controlling apparatus further comprising:
storing means for storing the type 3 encryption key; and
second decrypting means for decrypting the read main data using the stored type 3 encryption key.

7. A data usage controlling apparatus in accordance with claim 2,
wherein the updating means updates the type 1 key by performing a predetermined calculation on the read type 1 key.

8. A data usage controlling apparatus in accordance with claim 2,
wherein the updating means updates the type 1 key by adding one to the read type 1 key.

9. A data usage controlling method that
(1) reads a type 1 key from a storage unit and
   (a) main data,
   (b) an encrypted type 2 key produced by encrypting a type 2 key using the type 1 key, and
   (c) encrypted condition information produced by encrypting condition information using the type 2 key from a recording medium, the condition information being for use in judging as to whether usage of the main data is permitted and not used as an encryption key,
(2) decrypts the encrypted condition information using the type 2 key, and
(3) controls usage of the read main data based on the condition information, the data usage controlling method comprising the following steps:
updating the condition information in accordance with usage of the main data;
generating a new type 2 key in accordance with the usage of the main data;
encrypting the updated condition information using the new type 2 key and replacing the encrypted condition information on the recording medium with the encrypted updated condition information;
updating the type 1 key in accordance with the usage of the main data; and
encrypting the new type 2 key using the updated type 1 key and replacing the encrypted type 2 key on the recording medium with the encrypted new type 2 key.

10. A computer-readable recording medium storing a program that
(1) reads a type 1 key from a storage unit and
   (a) main data,
   (b) an encrypted type 2 key produced by encrypting a type 2 key using the type 1 key, and
   (c) encrypted condition information produced by encrypting condition information using the type 2 key from a recording medium, the condition information being for use in judging as to whether usage of the main data is permitted and not used as an encryption key,
(2) decrypts the encrypted condition information using the type 2 key, and
(3) controls usage of the read main data based on the condition information, the program including instructions for executing the following processes:
updating the decrypted condition information in accordance with usage of the main data;
generating a new type 2 key in accordance with usage of the main data;
encrypting the updated condition information using the new type 2 key and replacing the encrypted condition information on the recording medium with the encrypted updated condition information;
updating the type 1 key in accordance with usage of the main data; and
encrypting the new type 2 key using the updated type 1 key and replacing the encrypted type 2 key on the recording medium with the encrypted new type 2 key.

11. A data usage controlling apparatus in accordance with claim 1,
wherein the condition information shows a number of times permitted to use the main data and is updated by reducing the permitted number by one each time the main data is used.

* * * * *